US010377191B2

(12) United States Patent
Kim

(10) Patent No.: US 10,377,191 B2
(45) Date of Patent: Aug. 13, 2019

(54) TIRE PRESSURE ESTIMATION APPARATUS AND ESTIMATION METHOD THEREOF

(71) Applicant: MANDO CORPORATION, Gyeonggi-do (KR)

(72) Inventor: Joong-Hyun Kim, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 146 days.

(21) Appl. No.: 15/453,865

(22) Filed: Mar. 8, 2017

(65) Prior Publication Data
US 2017/0259629 A1    Sep. 14, 2017

(30) Foreign Application Priority Data

Mar. 11, 2016  (KR) ......................... 10-2016-0029569

(51) Int. Cl.
*B60C 23/04* (2006.01)
*B60C 23/06* (2006.01)

(52) U.S. Cl.
CPC ........ *B60C 23/0488* (2013.01); *B60C 23/062* (2013.01)

(58) Field of Classification Search
CPC .. B60C 23/0488; B60C 23/062; B60C 23/061
See application file for complete search history.

(56) References Cited

U.S. PATENT DOCUMENTS

| 5,553,491 A | * | 9/1996 | Naito | B60C 23/061 73/146.5 |
| 5,670,716 A | * | 9/1997 | Tamasho | B60C 23/061 340/444 |
| 5,982,279 A | * | 11/1999 | Tominaga | B60C 23/062 340/442 |
| 6,064,931 A | * | 5/2000 | Sawada | B60C 23/061 267/140.14 |

FOREIGN PATENT DOCUMENTS

| KR | 10-2009-0034519 | 4/2009 |
| KR | 10-2013-0050681 | 5/2013 |

* cited by examiner

*Primary Examiner* — Manuel L Barbee
(74) *Attorney, Agent, or Firm* — Ladas & Parry, LLP

(57) ABSTRACT

Disclosed herein are a tire pressure estimating apparatus and a tire pressure estimating method thereof. The tire pressure estimating apparatus according to an embodiment of the present disclosure includes an input unit that receives a current wheel speed signal sensed by a sensing device, an analysis unit that analyzes a suspension resonance frequency value according to a current load value based on the input current wheel speed signal, a determination unit that determines whether the current load value is increased for a certain period of time, a compensation unit that compensates for a tire relative dynamic radius difference value and a tire relative air pressure difference value according to a load increase by applying a load compensation model to a tire dynamic radius analysis model, when the current load value is increased for the certain period of time, and an estimation unit that estimates a final tire pressure value based on the compensated tire relative dynamic radius difference value and tire relative air pressure difference value.

12 Claims, 9 Drawing Sheets

TIRE PRESSURE ESTIMATION APPARATUS AND ESTIMATION METHOD THEREOF

CROSS-REFERENCE TO RELATED APPLICATION

This application claims the benefit of Korean Patent Application No. 2016-0029569, filed on Mar. 11, 2016 in the Korean Intellectual Property Office, the disclosure of which is incorporated herein by reference.

BACKGROUND

1. Field

Embodiments of the present disclosure relate to a tire pressure estimating apparatus and a tire pressure estimating method thereof.

2. Description of the Related Art

In general, a conventional tire pressure estimating apparatus determines whether a current pressure state of a tire is abnormal.

For example, the conventional tire pressure estimating apparatus determines whether the current pressure state of the tire is abnormal using a current wheel speed.

Since the conventional tire pressure estimating apparatus has a limitation in accurately and efficiently estimating the pressure state of the tire, an initial response to the current tire state is delayed, thereby causing a traffic accident.

Therefore, in recent years, studies on an improved tire pressure estimating apparatus and a tire pressure estimating method thereof which can accurately and efficiently estimate a pressure state of a tire have been continuously carried out.

In addition, in recent years, studies on an improved tire pressure estimating apparatus and a tire pressure estimating method thereof which can suppress anxiety about a current tire state while inducing a driver to drive with care and rapidly induce an initial response to the current tire state have been continuously carried out.

SUMMARY

Therefore, it is an aspect of the present disclosure to provide a tire pressure estimating apparatus and a tire pressure estimating method thereof, which may accurately and efficiently estimate a pressure state of a tire.

In addition, it is another aspect of the present disclosure to provide a tire pressure estimating apparatus and a tire pressure estimating method thereof, which may suppress anxiety about a current tire state while inducing a driver to drive with care.

In addition, it is still another aspect of the present disclosure to provide a tire pressure estimating apparatus and a tire pressure estimating method thereof, which may rapidly induce an initial response to a current tire state while inducing a driver to drive with care.

Additional aspects of the disclosure will be set forth in part in the description which follows and, in part, will be obvious from the description, or may be learned by practice of the disclosure.

In accordance with one aspect of the present disclosure, a tire pressure estimating apparatus includes: an input unit that receives a current wheel speed signal sensed by a sensing device; an analysis unit that analyzes a suspension resonance frequency value according to a current load value based on the input current wheel speed signal; a determination unit that determines whether the current load value is increased for a certain period of time; a compensation unit that compensates for a tire relative dynamic radius difference value and a tire relative air pressure difference value according to a load increase by applying a load compensation model to a tire dynamic radius analysis model, when the current load value is increased for the certain period of time; and an estimation unit that estimates a final tire pressure value based on the compensated tire relative dynamic radius difference value and tire relative air pressure difference value.

Here, the load compensation model may include a suspension resonance frequency variation value due to a load change and a parameter value that is estimated in real time by a Kalman filter.

Also, the tire dynamic radius analysis model may include a tire angular velocity value and a tire relative angular velocity difference value.

Also, the tire pressure estimating apparatus may further include an identification unit that identifies that the tire relative dynamic radius difference value and the tire relative air pressure difference value according to the load increase are compensated, when the current load value is increased for the certain period of time.

Also, the determination unit may further determine whether the estimated final tire pressure value is a set target tire pressure value.

Also, the tire pressure estimating apparatus may further include an identification unit that identifies that the final tire pressure value is abnormal when the estimated final tire pressure value is not the target tire pressure value.

In accordance with another aspect of the present disclosure, a tire pressure estimating method includes: receiving a current wheel speed signal sensed by a sensing device; analyzing a suspension resonance frequency value according to a current load value based on the input current wheel speed signal; determining whether the current load value is increased for a certain period of time; compensating for a tire relative dynamic radius difference value and a tire relative air pressure difference value according to a load increase by applying a load compensation model to a tire dynamic radius analysis model, when the current load value is increased for the certain period of time; and estimating a final tire pressure value based on the compensated tire relative dynamic radius difference value and tire relative air pressure difference value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present invention to a person having ordinary skill in the art to which the present invention belongs. The present invention is not limited to the embodiments disclosed herein but may be embodied in other forms. The drawings are only schematic and the sizes of components may be exaggerated for clarity.

Figure 1:
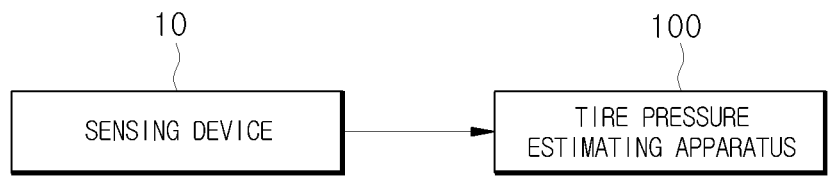
FIG. 1 is a block diagram showing a state in which a tire pressure estimating apparatus according to a first embodiment of the present disclosure is connected to a sensing device.
Figure 2:
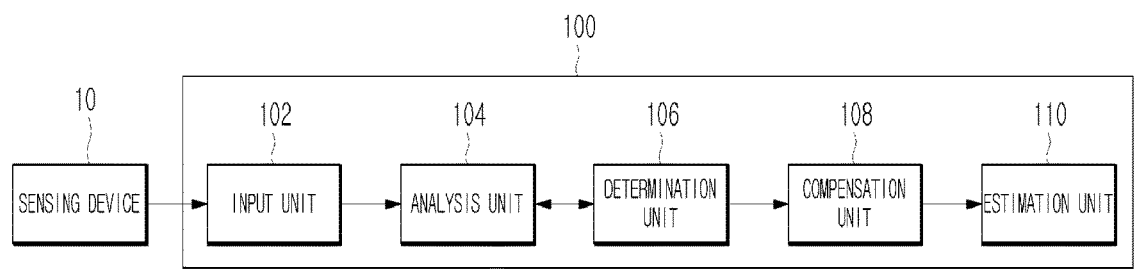
FIG. 2 is a block diagram showing an example of the tire pressure estimating apparatus shown in FIG. 1.

FIG. 1 is a block diagram showing a state in which a tire pressure estimating apparatus according to a first embodiment of the present disclosure is connected to a sensing device, and FIG. 2 is a block diagram showing an example of the tire pressure estimating apparatus shown in FIG. 1.

Figure 3:
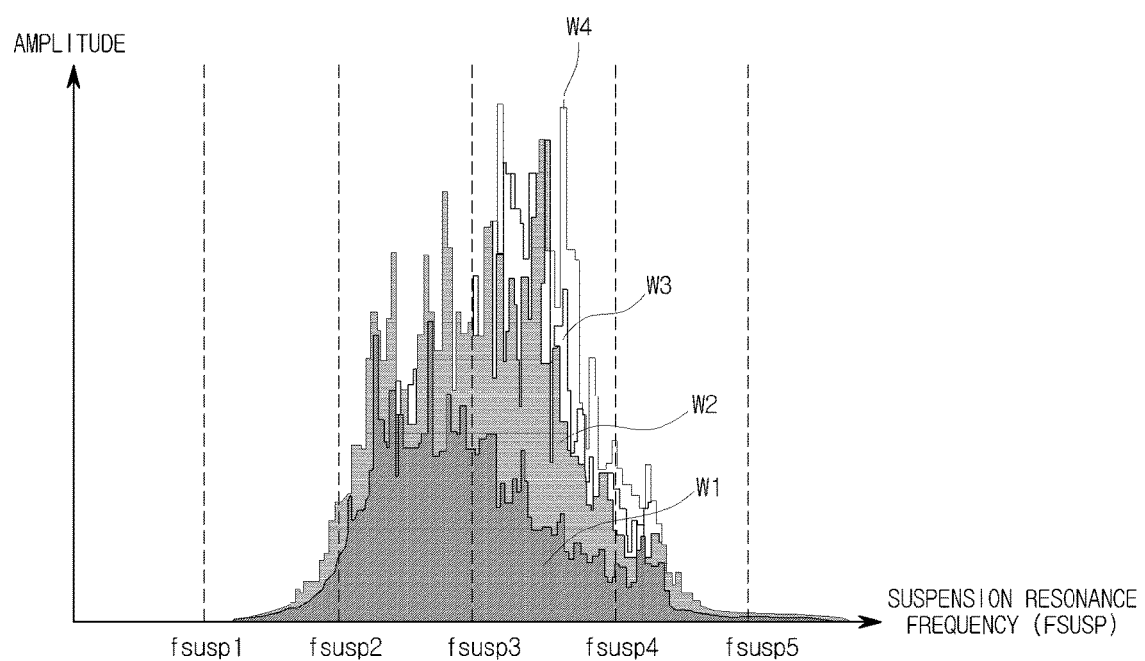
FIG. 3 is a graph showing a process of determining whether a determination unit shown in FIG. 2 outputs an amplified pulse in which a current load value is increased for a certain period of time.

FIG. 3 is a graph showing a process of determining whether a determination unit shown in FIG. 2 outputs an amplified pulse in which a current load value is increased for a certain period of time.

Figure 4:
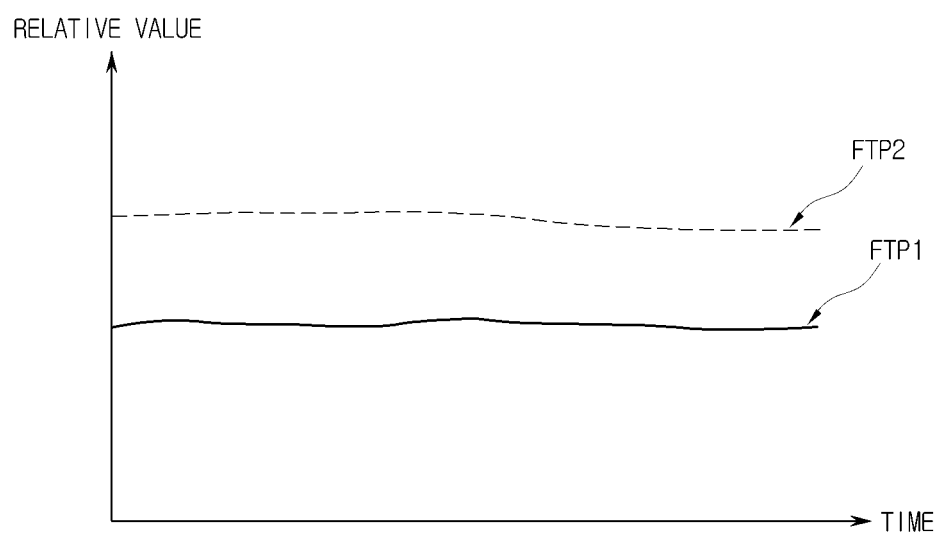
FIG. 4 is a graph showing a comparison between a final tire pressure value estimated when a load is present and a final tire pressure value estimated when a load is absent, using a conventional tire pressure estimating apparatus.

FIG. 4 is a graph showing a comparison between a final tire pressure value estimated when a load is present and a final tire pressure value estimated when a load is absent, using a conventional tire pressure estimating apparatus.

Figure 5:
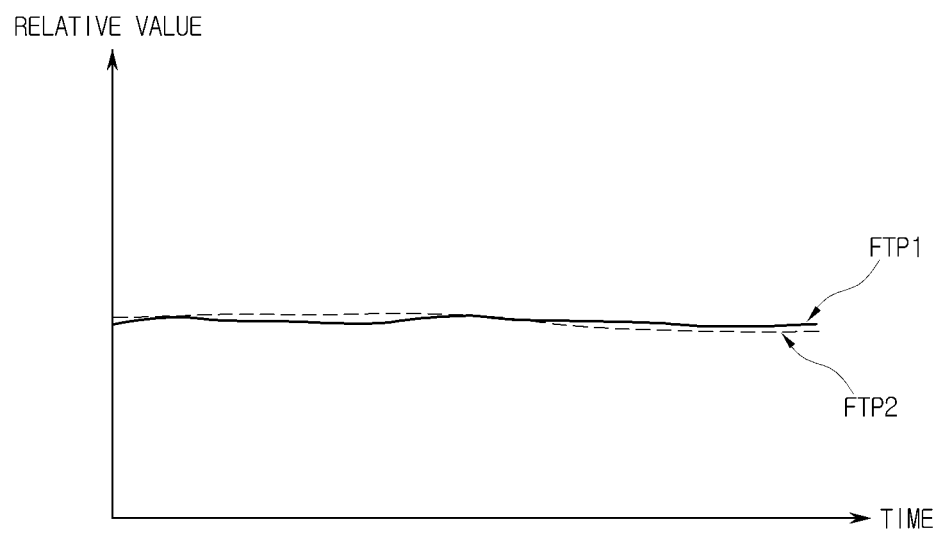
FIG. 5 is a graph showing a comparison between a final tire pressure value estimated when a load is present and a final tire pressure value estimated when a load is absent, using a tire pressure estimating apparatus according to an embodiment of the present disclosure.

FIG. 5 is a graph showing a comparison between a final tire pressure value estimated when a load is present and a final tire pressure value estimated when a load is absent, using a tire pressure estimating apparatus according to an embodiment of the present disclosure.

Referring to FIGS. 1 to 5, a tire pressure estimating apparatus 100 according to a first embodiment of the present disclosure includes an input unit 102, an analysis unit 104, a determination unit 106, a compensation unit 108, and an estimation unit 110.

The input unit 102 receives a current wheel speed signal sensed by a sensing device 10.

At this time, although not shown, the sensing device 10 may include a wheel speed sensor (not shown) for sensing a current wheel speed signal.

The analysis unit 104 analyzes a suspension resonance frequency value according to a current load value based on the current wheel speed signal input to the input unit 102, and the determination unit 106 determines whether the current load value among the suspension resonance frequency values according to the current load value analyzed by the analysis unit 104 is increased for a certain period of time.

For example, as shown in FIGS. 2 and 3, the determination unit 106 may determine whether current load values W2, W3, and W4 among suspension resonance frequency values fsusp1 to fsusp5 according to the current load values W2, W3, and W4 analyzed by the analysis unit 104 output amplified pulses which are increased for a certain period of time.

Here, W1 may be a state in which a load is absent, W2 may be a state in which a load is present, W3 may be a state having a load value larger than that of W2, and W4 may be a state having a load value larger than that of W3.

When the determination unit 106 determines that the current load value is increased for a certain period of time, the compensation unit 108 compensates for a tire relative dynamic radius difference value and a tire relative air pressure difference value according to a load increase by applying a load compensation model to a tire dynamic radius analysis model.

Here, the tire dynamic radius analysis model may include a tire angular velocity value and a tire relative angular velocity difference value.

At this time, the load compensation model may include a suspension resonance frequency variation value due to a load change, and a parameter value that is estimated in real time by a Kalman filter.

For example, the tire dynamic radius analysis model, the load compensation model, the tire relative dynamic radius difference value, and the tire relative air pressure difference value may be expressed by the following Equation 1, and the following Equation 1 may be rewritten as Equation 3 using Equation 2 below.

$$\delta_{fl\_rl} = R\left(\frac{\omega_{fl} - \omega_{rl}}{\omega_{fl}}\right) = K_p \Delta P_{fl\_rl} - K_W \Delta W \quad \text{<Equation 1>}$$

$$\delta_{fr\_rl} = R\left(\frac{\omega_{fr} - \omega_{rl}}{\omega_{fr}}\right) = K_p \Delta P_{fr\_rl} - K_W \Delta W$$

$$\delta_{rr\_rl} = R\left(\frac{\omega_{rr} - \omega_{rl}}{\omega_{rr}}\right) = K_p \Delta P_{rr\_rl}$$

$$K_W \Delta W = K_{susp} \Delta f_{susp} \quad \text{<Equation 2>}$$

$$\delta_{fl\_rl} = R\left(\frac{\omega_{fl} - \omega_{rl}}{\omega_{fl}}\right) + K_{susp} \Delta f_{susp} = K_p \Delta P_{fl\_rl} \quad \text{<Equation 3>}$$

$$\delta_{fr\_rl} = R\left(\frac{\omega_{fr} - \omega_{rl}}{\omega_{fr}}\right) + K_{susp} \Delta f_{susp} = K_p \Delta P_{fl\_rl}$$

$$\delta_{rr\_rl} = R\left(\frac{\omega_{rr} - \omega_{rl}}{\omega_{rr}}\right) = K_p \Delta P_{rr\_rl}$$

Here, the tire dynamic radius analysis model may be $$R\left(\frac{\omega_{fl} - \omega_{rl}}{\omega_{fL}}\right), R\left(\frac{\omega_{fr} - \omega_{rl}}{\omega_{fr}}\right), \text{ or } R\left(\frac{\omega_{rr} - w_{rl}}{\omega_{rr}}\right).$$

At this time, R denotes a typical tire radius that is a standard, $\omega_{fl}$ denotes a left front tire angular velocity value, $\omega_{rl}$ denotes a left rear tire angular velocity value, $\omega_{fr}$ denotes a right front tire angular velocity value, and $\omega_{rr}$ denotes a right rear tire angular velocity value.

In addition, the load compensation model may be $K_W \Delta W$ or $K_{susp} \Delta f_{susp}$.

At this time, $K_W$ denotes a parameter value for a load estimated in real time by a Kalman filter, $\Delta W$ denotes a load variation value that a suspension receives, $K_{susp}$ denotes a parameter value for a suspension resonance frequency estimated in real time by a Kalman filter, and $\Delta f_{susp}$ denotes a suspension resonance frequency variation value due to a load change.

In addition, the tire relative dynamic radius difference value may be $\delta_{fl\_rl}$, $\delta_{fr\_rl}$, or $\delta_{rr\_rl}$.

At this time, $\delta_{fl\_rl}$ denotes a difference value between a left front tire dynamic radius value and a left rear tire dynamic radius value, $\delta_{fr\_rl}$ denotes a difference value between a right front tire dynamic radius value and a left rear tire dynamic radius value, and $\delta_{rr\_rl}$ denotes a difference value between a right rear tire dynamic radius value and a left rear tire dynamic radius value.

In addition, the tire relative air pressure difference value may be $\Delta P_{fl\_rl}$, $\Delta P_{fr\_rl}$, or $\Delta P_{rr\_rl}$.

At this time, $K_p$ denotes a parameter value for a tire air pressure estimated in real time by a Kalman filter, $\Delta P_{fl\_rl}$ denotes a difference value between a left front tire air pressure value and a left rear tire air pressure value, $\Delta P_{fr\_rl}$ denotes a difference value between a right front tire air pressure value and a left rear tire air pressure value, and $\Delta P_{rr\_rl}$ denotes a difference value between a right rear tire air pressure value and a left rear tire air pressure value.

The estimation unit 110 estimates a final tire pressure value based on the tire relative dynamic radius difference value and the tire relative air pressure difference value compensated by the compensation unit 108.

As shown in FIG. 5, when compared between a final tire pressure value FTP2 that is compensated by the compensation unit 108 in which the load compensation model is applied to the tire dynamic radius analysis model in a state in which a load is present and estimated and a final tire pressure value FTP1 that is estimated in a state in which a load is absent, it can been seen that the estimation unit 110 may accurately and efficiently estimate a pressure state of a corresponding tire because there is no difference in the relative value.

That is, as shown in FIG. 4, when compared between the final tire pressure value FTP2 estimated when a load is present and the final tire pressure value FTP1 estimated when a load is absent using a conventional tire pressure estimating apparatus, it can be seen that there is a limitation in accurately and efficiently estimating a pressure state of a corresponding tire because there is a difference in the relative value.

At this time, although not shown, the input unit 102, the analysis unit 104, the determination unit 106, the compensation unit 108, and the estimation unit 110 may be provided to a typical ECU (electric control unit, not shown) for determining the overall operation, performing input, analysis, and compensation, and estimating a final tire pressure value as a main computer applied to a vehicle.

In addition, although not shown, the input unit 102, the analysis unit 104, the determination unit 106, the compensation unit 108, and the estimation unit 110 may be provided to a typical MCU (micro control unit, not shown) that is provided with a processor, a memory, and an input/output device inside a single chip to determine the overall operation, perform input, analysis, and compensation, and estimate a final tire pressure value.

In addition, the input unit 102, the analysis unit 104, the determination unit 106, the compensation unit 108, and the estimation unit 110 are not limited thereto, and may be provided to all determination means, input means, analysis means, compensation means, and estimation means that can determine the overall operation of a vehicle, perform input, analysis, and compensation, and estimate a final tire pressure value.

Here, the input unit 102, the analysis unit 104, the determination unit 106, the compensation unit 108, and the estimation unit 110 may be integrally provided to an ECU (not shown) or an MCU (not shown), or separately provided to an ECU (not shown) or an MCU (not shown).

A tire pressure estimating method for estimating a tire pressure using the tire pressure estimating apparatus 100 according to the first embodiment of the present disclosure will be described with reference to FIG. 6.

Figure 6:
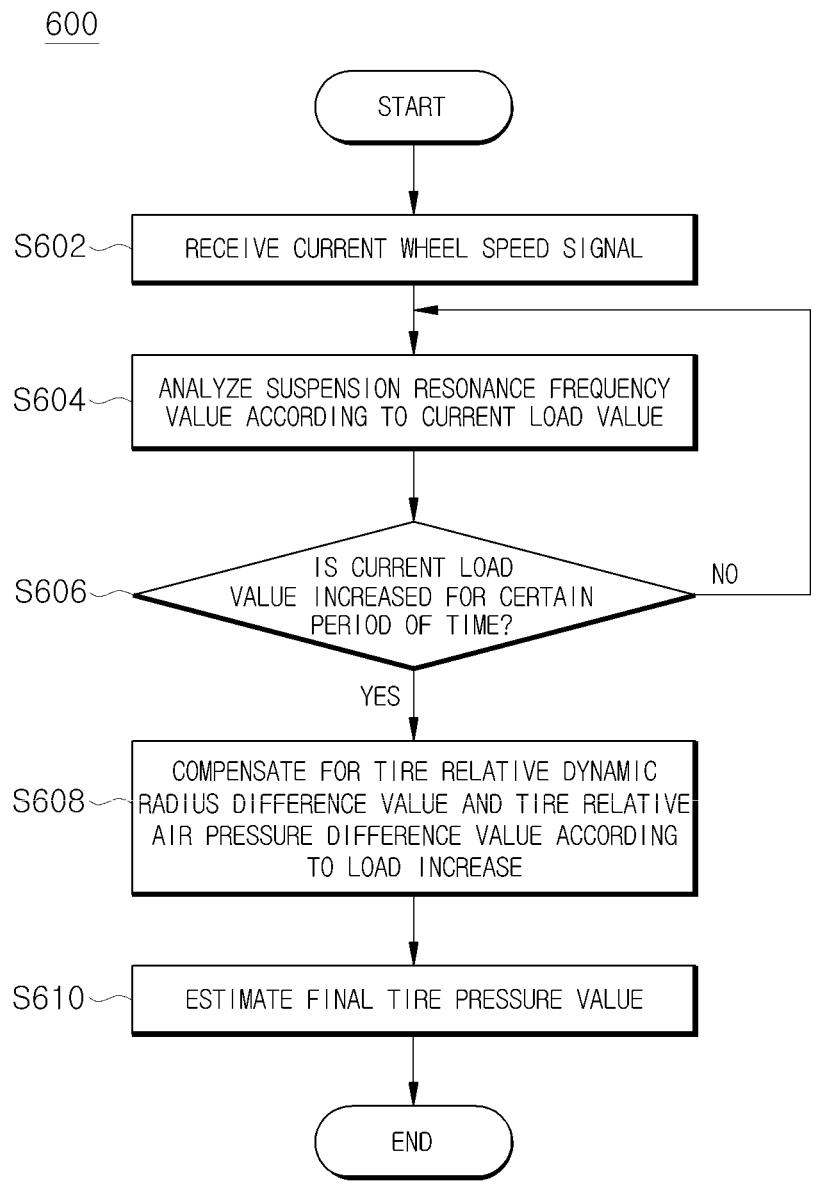
FIG. 6 is a flowchart showing an example of a tire pressure estimating method of a tire pressure estimating apparatus according to a first embodiment of the present disclosure.

FIG. 6 is a flowchart showing an example of a tire pressure estimating method of a tire pressure estimating apparatus according to a first embodiment of the present disclosure.

Referring to FIG. 6, a tire pressure estimating method 600 of the tire pressure estimating apparatus 100 of FIG. 2 according to the first embodiment of the present disclosure includes an input operation S602, an analysis operation S604, a determination operation S606, a compensation operation S608, and an estimation operation S610.

First, in the input operation S602, the input unit 102 of FIG. 2 receives a current wheel speed signal sensed by the sensing device 10 of FIG. 2.

Next, in the analysis operation S604, the analysis unit 104 of FIG. 2 analyzes a suspension resonance frequency value according to a current load value based on the current wheel speed signal input to the input unit 102 of FIG. 2.

Next, in the determination operation S606, the determination unit 106 of FIG. 2 determines whether the current load value among the suspension resonance frequency values according to the current load value analyzed by the analysis unit 104 of FIG. 2 is increased for a certain period of time.

Next, in the compensation operation S608, when the determination unit 106 of FIG. 2 determines that the current load value is increased for a certain period of time, the compensation unit 108 of FIG. 2 compensates for a tire relative dynamic radius difference value and a tire relative air pressure difference value according to a load increase by applying a load compensation model to a tire dynamic radius analysis model.

Next, in the estimation operation S610, the estimation unit 110 of FIG. 2 estimates a final tire pressure value based on the tire relative dynamic radius difference value and the tire relative air pressure difference value compensated by the compensation unit 108 of FIG. 2.

In this manner, the tire pressure estimating apparatus 100 according to the first embodiment of the present disclosure may include the input unit 102, the analysis unit 104, the determination unit 106, the compensation unit 108, and the estimation unit 110, and perform the input operation S602, the analysis operation S604, the determination operation S606, the compensation operation S608, and the estimation operation S610 of the tire pressure estimating method 600.

Accordingly, when the current load value is increased for a certain period of time, the tire pressure estimating apparatus 100 and the tire pressure estimating method 600 thereof according to the first embodiment of the present disclosure may compensate for the tire relative dynamic radius difference value and the tire relative air pressure difference value according to the increase in the load by applying the load compensation model to the tire dynamic radius analysis model.

Therefore, the tire pressure estimating apparatus 100 and the tire pressure estimating method 600 thereof according to the first embodiment of the present disclosure may estimate the final tire pressure value based on the compensated tire relative dynamic radius difference value and tire relative air pressure difference value, thereby accurately and efficiently estimating the pressure state of the corresponding tire.

Figure 7:
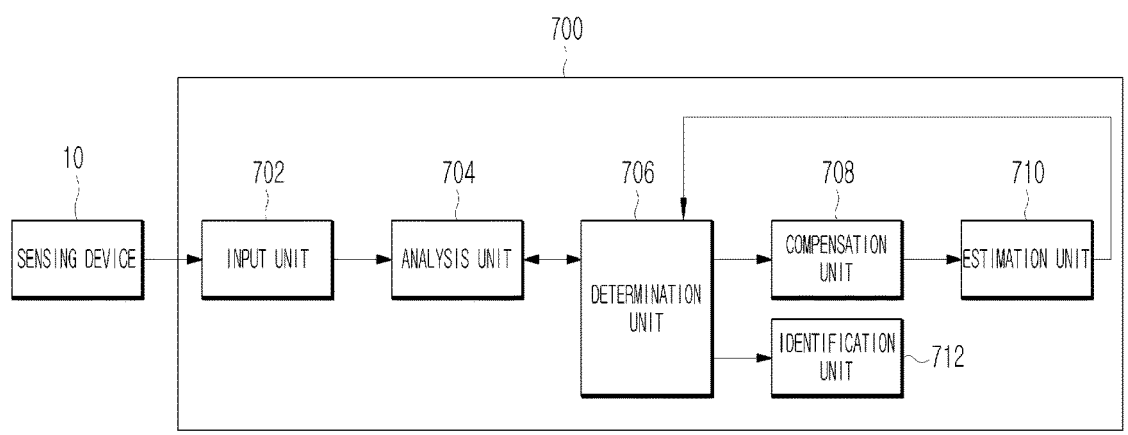
FIG. 7 is a block diagram showing an example of a tire pressure estimating apparatus according to a second embodiment of the present disclosure.

FIG. 7 is a block diagram showing an example of a tire pressure estimating apparatus according to a second embodiment of the present disclosure.

Referring to FIG. 7, a tire pressure estimating apparatus 700 according to a second embodiment of the present disclosure includes an input unit 702, an analysis unit 704, a determination unit 706, a compensation unit 708, and an estimation unit 710 in the same manner as that in the tire pressure estimating apparatus 100 of FIG. 2 according to the first embodiment of the present disclosure.

In this manner, functions of the input unit 702, the analysis unit 704, the determination unit 706, the compensation unit 708, and the estimation unit 710 of the tire pressure estimating apparatus 700 according to the second embodiment of the present disclosure and organic connection relation therebetween are the same as functions of the input unit 102 of FIG. 2, the analysis unit 104 of FIG. 2, the determination unit 106 of FIG. 2, the compensation unit 108 of FIG. 2, and the estimation unit 110 of FIG. 2 of the tire pressure estimating apparatus 100 of FIG. 2 according to the first embodiment of the present disclosure and organic connection relation therebetween, and therefore additional descriptions thereof will be omitted.

Here, the tire pressure estimating apparatus 700 according to the second embodiment of the present disclosure may further include an identification unit 712.

That is, when the determination unit 706 determines that a current load value is increased for a certain period of time, the identification unit 712 may identify that a tire relative dynamic radius difference value and a tire relative air pressure difference value according to a load increase are compensated.

In addition, the determination unit 706 of the tire pressure estimating apparatus 700 according to the second embodiment of the present disclosure may further determine whether a final tire pressure value estimated by the estimation unit 710 is a set target tire pressure value.

At this time, when the determination unit 706 determines that the final tire pressure value estimated by the estimation unit 710 is not the target tire pressure value set in the determination unit 706, the identification unit 712 may further identify that the final tire pressure value is abnormal.

Here, although not shown, the identification unit 712 may include at least one of an alarm (not shown), a speaker (not shown), and a light emitting member (not shown) which are provided for a driver to identify a vehicle's information or state, and identify that the tire relative dynamic radius difference value and the tire relative air pressure difference value according to the increase in the load are compensated and the final tire pressure value is abnormal, through at least one of an alarming operation of the alarm (not shown), a voice operation of the speaker (not shown), and a light emitting operation of the light emitting member (not shown).

In addition, although not shown, the identification unit 712 may include at least one of a HMI (human machine interface) module (not shown) and a HUD (head-up display) module (not shown) which are mounted to interface a user and a machine so that a driver can grasp a vehicle's information or state, and identify that the tire relative dynamic radius difference value and the tire relative air pressure difference value according to the increase in the load are compensated and the final tire pressure value is abnormal, through at least one of a HMI message display operation of the HMI module (not shown) and a HUD message display operation of the HUD module (not shown).

A tire pressure estimating method for estimating a tire pressure using the tire pressure estimating apparatus 700 according to the second embodiment of the present disclosure will be described with reference to FIGS. 8 and 9.

Figure 8:
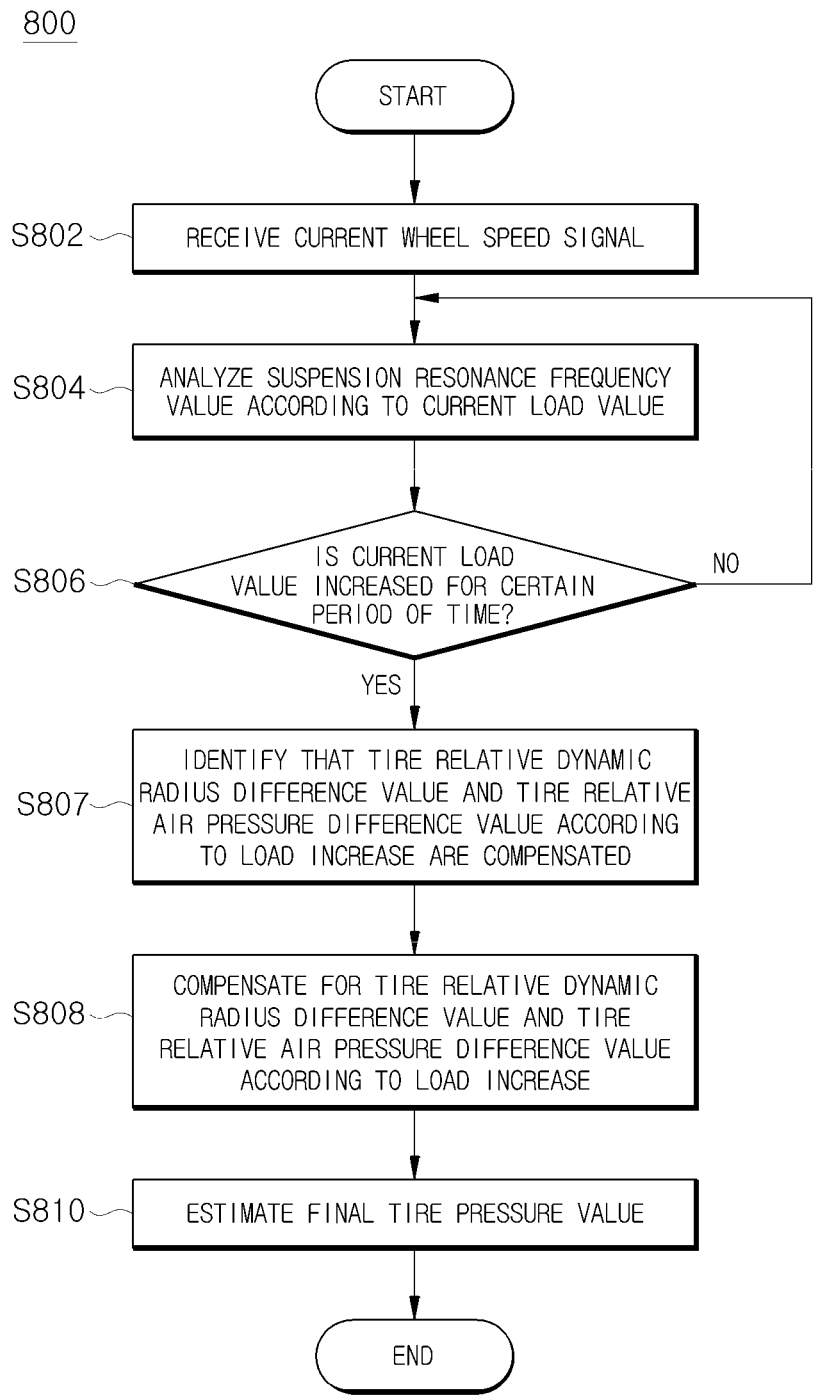
FIG. 8 is a flowchart showing an example of a tire pressure estimating method of a tire pressure estimating apparatus according to a second embodiment of the present disclosure.
Figure 9:
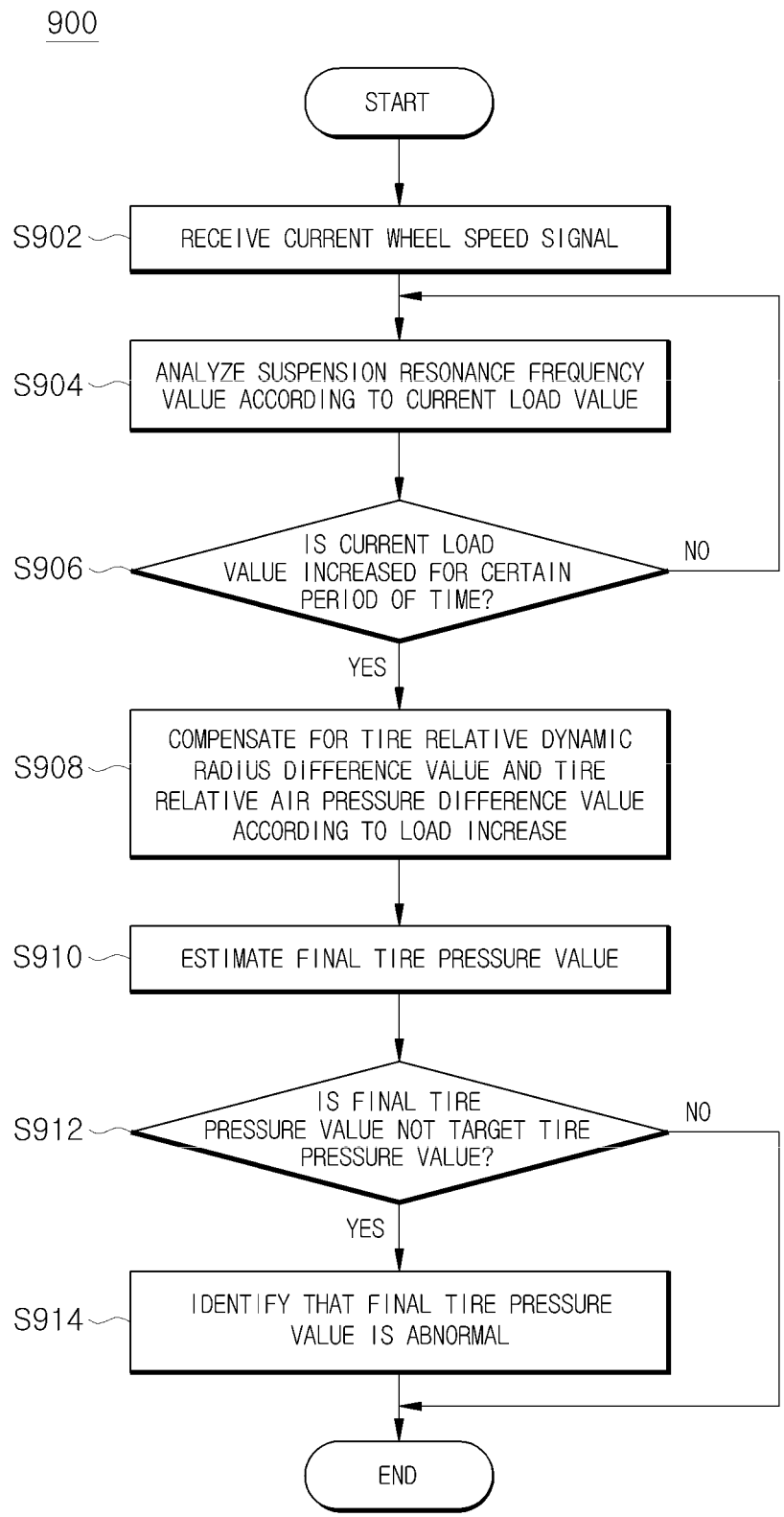
FIG. 9 is a flowchart showing another example of a tire pressure estimating method of a tire pressure estimating apparatus according to a second embodiment of the present disclosure.

FIG. 8 is a flowchart showing an example of a tire pressure estimating method of a tire pressure estimating apparatus according to a second embodiment of the present disclosure, and FIG. 9 is a flowchart showing another example of a tire pressure estimating method of a tire pressure estimating apparatus according to a second embodiment of the present disclosure.

Referring to FIGS. 8 and 9, tire pressure estimating methods 800 and 900 of the tire pressure estimating apparatus 700 of FIG. 7 according to the second embodiment of the present disclosure include input operations S802 and S902, analysis operations S804 and S904, determination operations S806 and S906, compensation operations S808 and S908, and estimation operations S810 and S910, respectively, in the same manner as that in the tire pressure estimating method 600 of FIG. 6 of the tire pressure estimating apparatus 100 of FIG. 2 according to the first embodiment of the present disclosure.

In this manner, functions of the respective operations of the tire pressure estimating methods 800 and 900 of the tire pressure estimating apparatus 700 of FIG. 7 according to the second embodiment of the present disclosure and organic connection relation therebetween are the same as functions of the respective operations of the tire pressure estimating method 600 of FIG. 6 of the tire pressure estimating apparatus 100 of FIG. 2 according to the first embodiment of the present disclosure and organic connection relation therebetween, and therefore additional descriptions thereof will be omitted.

Here, as shown in FIG. 8, the tire pressure estimating method 800 of the tire pressure estimating apparatus 700 of FIG. 7 according to the second embodiment of the present disclosure may further include a first identification operation S807.

For example, the first identification operation S807 may be performed after the determination operation S806 and before the compensation operation S808.

As another example, although not shown, the first identification operation S807 may be performed in synchronization with the compensation operation S808.

In this manner, in the first identification operation S807, when the determination unit 706 of FIG. 7 determines that a current load value is increased for a certain period of time, the identification unit 712 of FIG. 7 may identify that a tire relative dynamic radius difference value and a tire relative air pressure difference value according to a load increase are compensated.

In addition, as shown in FIG. 9, the tire pressure estimating method 900 of the tire pressure estimating apparatus 700 of FIG. 7 according to the second embodiment of the present disclosure may further include a determination operation S912 and a second identification operation S914.

In the determination operation S912, the determination unit 706 of FIG. 7 may determine whether a final tire pressure value estimated by the estimation unit 710 of FIG. 7 is a target tire pressure value set in the determination unit 706 of FIG. 7.

Next, in the second identification operation S914, when the determination unit 706 of FIG. 7 determines that the final tire pressure value estimated by the estimation unit 710 of FIG. 7 is not the target tire pressure value set in the determination unit 706 of FIG. 7, the identification unit 712 of FIG. 7 may identify that the final tire pressure value is abnormal.

In this manner, the tire pressure estimating apparatus 700 according to the second embodiment of the present disclosure may include the input unit 702, the analysis unit 704, the determination unit 706, the compensation unit 708, the estimation unit 710, and the identification unit 712, and perform the input operations S802 and S902, the analysis operations S804 and S904, the determination operations S806, S906, and S912, the first identification operation S807, the compensation operations S808 and S908, the estimation operations S810 and S910, the determination operation S912, and the second identification operation S914 of the tire pressure estimating methods 800 and 900.

Accordingly, when the current load value is increased for a certain period of time, the tire pressure estimating apparatus 700 and the tire pressure estimating methods 800 and 900 thereof according to the second embodiment of the present disclosure may compensate for the tire relative dynamic radius difference value and the tire relative air pressure difference value according to the increase in the load by applying the load compensation model to the tire dynamic radius analysis model.

Therefore, the tire pressure estimating apparatus 700 and the tire pressure estimating methods 800 and 900 thereof according to the second embodiment of the present disclosure may estimate the final tire pressure value based on the compensated tire relative dynamic radius difference value and tire relative air pressure difference value, thereby accurately and efficiently estimating the pressure state of the corresponding tire.

In addition, when the current load value is increased for a certain period of time, the tire pressure estimating apparatus 700 and the tire pressure estimating method 800 thereof according to the second embodiment of the present disclosure may identify that the tire relative dynamic radius difference value and the tire relative air pressure difference value according to the increase in the load are compensated.

Therefore, according to the tire pressure estimating apparatus 700 and the tire pressure estimating method 800 thereof according to the second embodiment of the present disclosure, it is possible for a driver to recognize that the tire relative dynamic radius difference value and the tire relative air pressure difference value according to the increase in the load are compensated, thereby suppressing anxiety about a current tire state while inducing the driver to drive with care.

In addition, according to the tire pressure estimating apparatus 700 and the tire pressure estimating method 900 thereof according to the second embodiment of the present disclosure, when the estimated final tire pressure value is not the target tire pressure value, it is possible to identify that the final tire pressure value is abnormal.

Therefore, according to the tire pressure estimating apparatus 700 and the tire pressure estimating method 900 thereof according to the second embodiment of the present disclosure, it is possible for a driver to recognize that the tire pressure is abnormal, thereby rapidly inducing an initial response to a current tire state while inducing the driver to drive with care.

As described above, the tire pressure estimating apparatus and the tire pressure estimating method thereof according to the embodiments of the present disclosure may accurately and efficiently estimate the pressure state of the tire.

In addition, the tire pressure estimating apparatus and the tire pressure estimating method thereof according to the embodiments of the present disclosure may suppress anxiety about a current tire state while inducing a driver to drive with care.

In addition, the tire pressure estimating apparatus and the tire pressure estimating method thereof according to the embodiments of the present disclosure may rapidly induce an initial response to the current tire state while inducing a driver to drive with care.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A tire pressure estimating apparatus comprising:
at least one processor and memory configured to:
receive a current wheel speed signal sensed by a sensing device;
determine whether a current load value of the current wheel speed signal is increased for a certain period of time;
compensate for a tire relative dynamic radius difference value and a tire relative air pressure difference value according to a load increase by applying a load compensation model to a tire dynamic radius analysis model, when the current load value is increased for the certain period of time; and
estimate a final tire pressure value based on the compensated tire relative dynamic radius difference value and tire relative air pressure difference value.

2. The tire pressure estimating apparatus according to claim 1, wherein the load compensation model includes a suspension resonance frequency variation value due to a load change and a parameter value that is estimated in real time by a Kalman filter.

3. The tire pressure estimating apparatus according to claim 1, wherein the tire dynamic radius analysis model includes a tire angular velocity value and a tire relative angular velocity difference value.

4. The tire pressure estimating apparatus according to claim 1, wherein the at least one processor is configured to identify that the tire relative dynamic radius difference value and the tire relative air pressure difference value according to the load increase are compensated, when the current load value is increased for the certain period of time.

5. The tire pressure estimating apparatus according to claim 1, wherein the at least one processor is configured to determine whether the estimated final tire pressure value is a set target tire pressure value.

6. The tire pressure estimating apparatus according to claim 5, wherein the at least one processor is configured to identify that the final tire pressure value is abnormal when the estimated final tire pressure value is not the target tire pressure value.

7. A tire pressure estimating method performed by at least one processor and memory, comprising:
receiving a current wheel speed signal sensed by a sensing device;
determining whether a current load value of the current wheel speed signal is increased for a certain period of time;
compensating for a tire relative dynamic radius difference value and a tire relative air pressure difference value according to a load increase by applying a load compensation model to a tire dynamic radius analysis model, when the current load value is increased for the certain period of time; and estimating a final tire pressure value based on the compensated tire relative dynamic radius difference value and tire relative air pressure difference value.

8. The tire pressure estimating method of claim 7, wherein the load compensation model includes a suspension resonance frequency variation value due to a load change and a parameter value that is estimated in real time by a Kalman filter.

9. The tire pressure estimating method of claim 7, wherein the tire dynamic radius analysis model includes a tire angular velocity value and a tire relative angular velocity difference value.

10. The tire pressure estimating method of claim 7, further comprising identifying that the tire relative dynamic radius difference value and the tire relative air pressure difference value according to the load increase are compensated, when the current load value is increased for the certain period of time.

11. The tire pressure estimating method of claim 7, wherein the determining whether the current load value is increased comprises determining whether the estimated final tire pressure value is a set target tire pressure value.

12. The tire pressure estimating method of claim 11, further comprising identifying that the final tire pressure value is abnormal when the estimated final tire pressure value is not the target tire pressure value.

* * * * *